(12) United States Patent
Sandler

(10) Patent No.: US 12,241,492 B2
(45) Date of Patent: Mar. 4, 2025

(54) SLAM LATCH FOR SPREADER

(71) Applicant: Buyers Products Company, Mentor, OH (US)

(72) Inventor: Philip Sandler, Mayfield Village, OH (US)

(73) Assignee: BUYERS PRODUCTS COMPANY, Mentor, OH (US)

( * ) Notice: Subject to any disclaimer, the term of this patent is extended or adjusted under 35 U.S.C. 154(b) by 491 days.

(21) Appl. No.: 17/736,310

(22) Filed: May 4, 2022

(65) Prior Publication Data
US 2023/0358257 A1 Nov. 9, 2023

(51) Int. Cl.
*F16B 2/18* (2006.01)
*E01H 10/00* (2006.01)

(52) U.S. Cl.
CPC ............. *F16B 2/18* (2013.01); *E01H 10/007* (2013.01)

(58) Field of Classification Search
CPC .......... E01H 10/007; F16B 2/18; E01C 19/20; E01C 19/201; E01C 19/203; E01C 2019/2055; E01C 2019/207; A01C 17/00; A01C 17/001
See application file for complete search history.

(56) References Cited

U.S. PATENT DOCUMENTS

| | | | | |
|---|---|---|---|---|
| 2,327,266 A * | 8/1943 | Hoffstetter | ............. | A01C 17/00 239/670 |
| 3,559,894 A * | 2/1971 | Murray | .................... | B60P 1/40 239/681 |
| 4,169,559 A * | 10/1979 | McKee | ................... | A01C 17/00 239/687 |
| 4,261,520 A * | 4/1981 | Hetrick | ................. | E01C 19/203 222/626 |
| 5,842,649 A * | 12/1998 | Beck | ...................... | E01C 19/203 239/677 |
| 5,950,934 A * | 9/1999 | Podesta | .................. | E01C 19/203 239/650 |
| 8,511,589 B2 * | 8/2013 | Richardson | ........... | E01H 10/007 239/662 |
| 9,085,863 B2 * | 7/2015 | Norkus | ................. | E01C 19/203 |
| 9,562,333 B2 | 2/2017 | Sandler et al. | | |
| 10,000,950 B2 * | 6/2018 | Sandler | ................... | E05B 83/16 |
| 10,526,754 B2 * | 1/2020 | Fox | ...................... | E01C 19/2045 |
| 2005/0184174 A1 * | 8/2005 | Bailey | .................. | E01C 19/203 239/668 |

* cited by examiner

*Primary Examiner* — Darren W Gorman
(74) *Attorney, Agent, or Firm* — Emerson, Thomson & Bennett, LLC; Roger D. Emerson

(57) ABSTRACT

Provided in this disclosure is a slam latch for attaching a chute to a hopper mounted onto a vehicle. A cover is secured to an exterior surface of the hopper and defines a void therebetween. First and second aligned holes are formed in the cover and the hopper. A pin is mounted to the cover for movement through the first and second holes and urges with a spring. A plunger is retained in the void and moves between a closed position that blocks the pin from engagement with the holes, and an open position that admits the pin for engagement. The chute includes an engagement member having a third hole. The chute is displaced such that the engagement member slides into the void and displaces the plunger, enabling engagement of the pin with the first, second and third holes, thereby attaching the chute to the hopper.

9 Claims, 10 Drawing Sheets

SLAM LATCH FOR SPREADER

I. BACKGROUND

A. Technical Field

This invention generally pertains to the field of devices for distributing a material onto a surface, Specifically, this invention pertains to the field of salt spreaders for distributing salt onto a roadway for melting snow and ice.

B. Description of Related Art

Spreaders have long been used to distribute material onto surfaces. Spreaders are used for applying salt to roadway surfaces such as roads, driveways, and parking lots for the purpose of melting snow and ice. Spreaders are conventionally mounted onto a vehicle such as a truck. Spreaders include a hopper for retaining a volume of material such as rock salt. The hopper includes a component for moving the material from the bottom of the hopper onto a motor-driven spinner disc, which centrifugally dispenses the material from the back of the truck onto the surface such as roadway, driveway, etc.

Typically, the spinner disc is mounted within a metal chute, attached to the hopper, to funnel the material onto the spinner disc and additionally to provide protection from any damage that might result from the road (i.e., collisions, being struck by objects, etc.) However, it can be difficult to access spinner disc within the chute for maintenance, cleaning, etc. It would be advantageous to have a more accessible chute housing for retaining the spinner disc.

II. SUMMARY

Provided in this disclosure is a spreader system of a vehicle. The spreader system includes a hopper for retaining material to be spread, which can be salt. A spinner disc can be used for centrifugally spreading the material received from the hopper. A chute is connected to the hopper for directing the material to the spinner disc. One or more slam latches are provided for attaching the chute to the hopper mounted onto the vehicle. A cover is secured to an exterior surface of the hopper and defines a void space between an interior surface of the cover and the exterior surface of the hopper. A first engagement hole is formed in the cover that is aligned with a second engagement hole formed in the hopper. A pin is mounted to an exterior surface of the cover for back-and-forth movement through the first and second engagement holes. A support is provided for perpendicularly retaining the pin against the exterior surface of the cover. A biasing member is used for urging the pin into engagement with the first and second engagement holes. A plunger is retained in the void and configured for free back-and-forth movement between a closed position and an open position. The closed position blocks the pin from engagement with the engagement hole, while the open position admits the pin for engagement with the engagement hole. An engagement member is provided on the chute, configured for sliding into the void. The engagement member has a third engagement hole for aligning between the first and second engagement holes. The chute is displaced such that the engagement member slides into the void and displaces the plunger, enabling engagement of the pin with the first, second and third engagement holes, thereby attaching the chute to the hopper.

Further aspects of the invention include a ring for gripping of the pin by a user, to withdraw the pin from the first, second and third engagement holes, thereby releasing the chute from the hopper. A bar column extends perpendicularly from the pin. The bar column is rotated into a notch formed in the support for retaining the pin in a retracted position. The biasing member is preferably a deformable coil spring concentrically mounted along the pin and retained between the bar column and an opposing surface of the support. The deformable coil spring urges the pin into engagement with the first, second and third engagement holes, thereby attaching the chute to the hopper.

Further additional aspects of the invention include a lip formed on the cover at an open bottom of the void for facilitating entry of the engagement member of the chute into the void for engagement with the plunger. The plunger is preferably vertically mounted so that is gravitationally drawn downwardly to the closed position and displaced upwardly by the engagement member into the open position. Additionally, one or more springs can be mounted in a top portion of the void for urging the plunger downwardly into the closed position.

An additional embodiment of the present invention includes a spreader system of a vehicle having a hopper for receiving material to be spread and a chute connected to the hopper with first and second hinges, and also including first and second engagement members on opposite sides each having an engagement hole. First and second slam latches are mounted on opposite sides of the hopper. Each of the slam latches are for engaging with the respective engagement holes of the first and second engagement members of the chute. Each of the first and second slam latches include a cover secured to an exterior surface of the hopper and defining a void between an interior surface of the cover and the exterior surface of the hopper. A first engagement hole is formed in the cover that is aligned with a second engagement hole formed in the hopper. A pin is mounted to an exterior surface of the cover, for back-and-forth movement through the first and second engagement holes. A support is provided for perpendicularly retaining the pin against the exterior surface of the cover. A biasing member urges the pin into engagement with the first and second engagement holes. A plunger is retained in the void and configured for free back-and-forth movement between a closed position and an open position. The closed position blocks the pin from engagement with the engagement hole, and the open position admits the pin for engagement with the engagement hole. Each engagement member of the chute is configured for sliding into the void of a respective slam latch. The engagement hole of each engagement member is configured for aligning between the first and second engagement holes of the respective slam latch. The chute is displaced such that each engagement member slides into the respective void and displaces the respective plunger, enabling engagement of the pin with the respective engagement holes, thereby attaching the chute to the hopper. In the present spreader system, the material to be spread is preferably salt.

Other benefits and advantages of this invention will become apparent to those skilled in the art to which it pertains upon reading and understanding of the following detailed specification.

III. BRIEF DESCRIPTION OF THE DRAWINGS

The disclosed slam latch may take physical form in certain parts and arrangement of parts, embodiments of which will be described in detail in this specification and illustrated in the accompanying drawings which form a part hereof and wherein:

FIGS. 1A, 1B, and 1C are side sectional views respectively depicting the present slam latch in a retracted position, with the pin resting against the plunger, and in an engagement position in accordance with an exemplary embodiment.

Figure 5A:
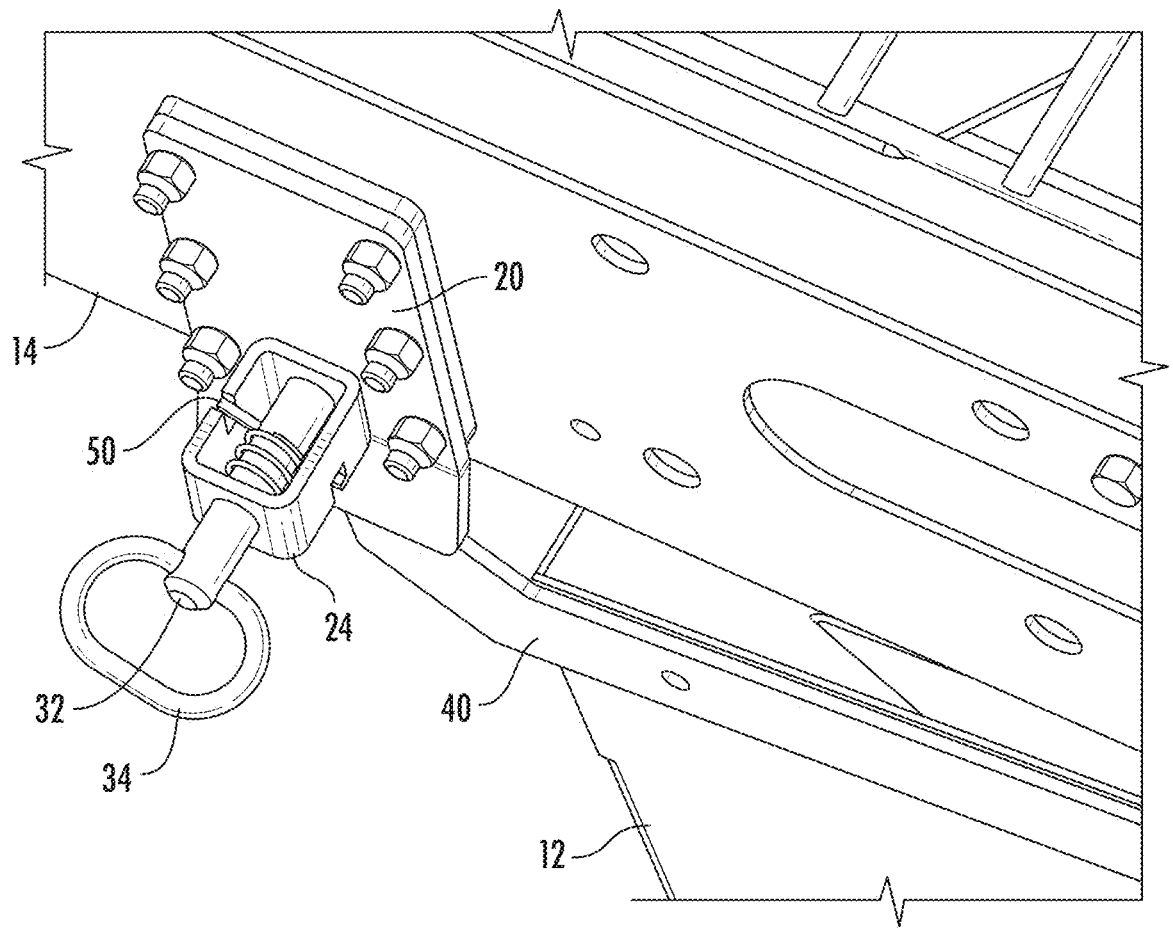
Figure 5B:
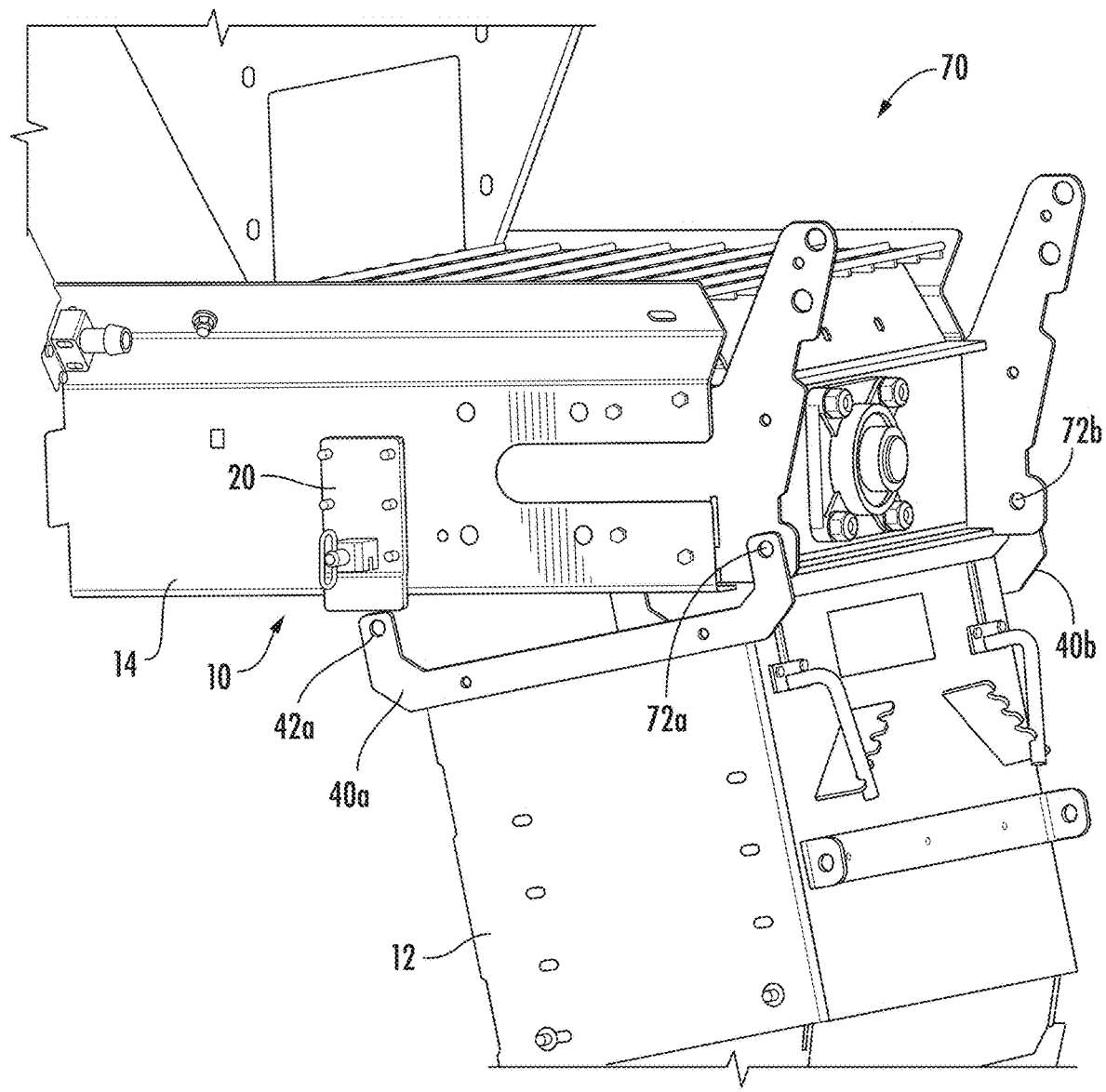
Figure 5C:
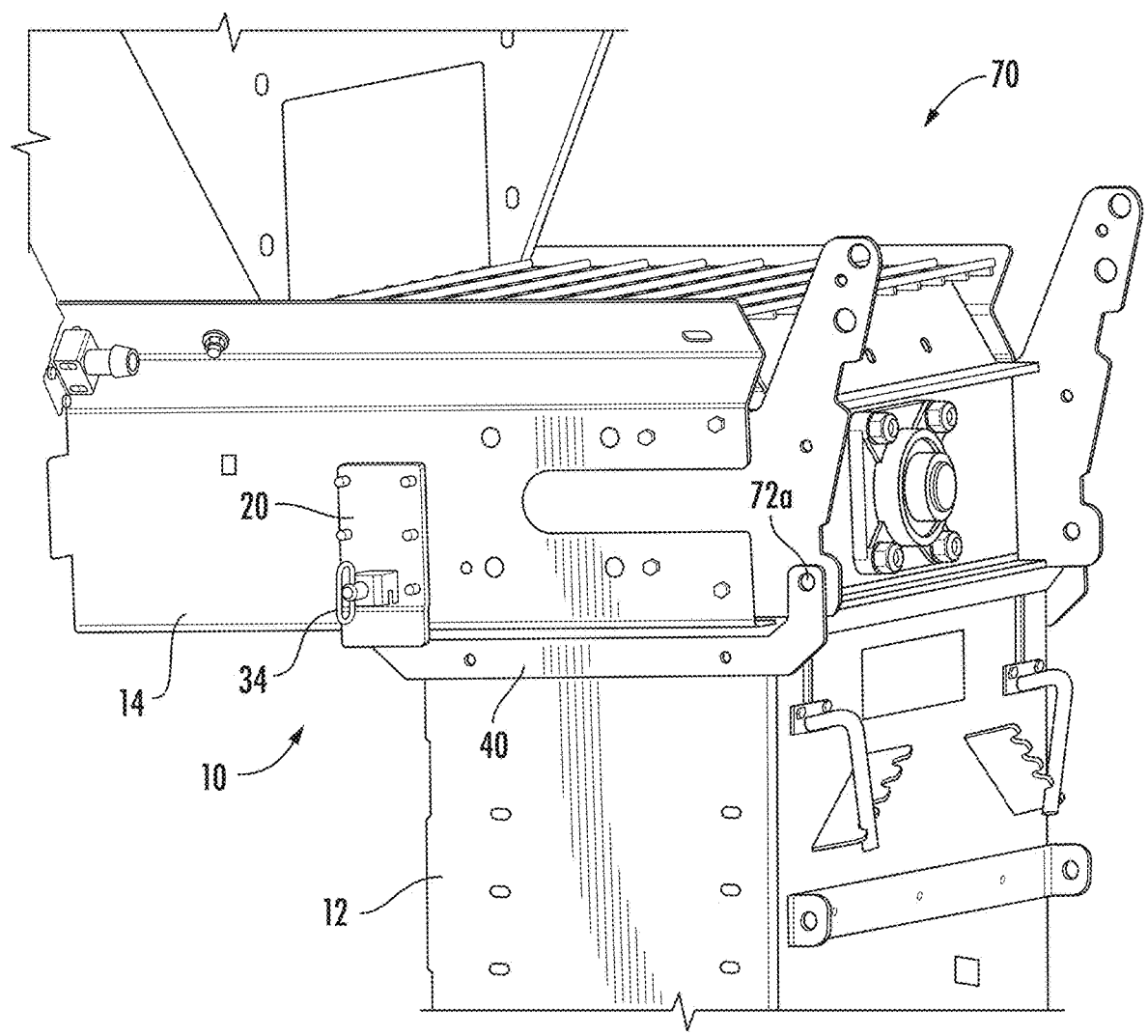

FIGS. 5A, 5B, and 5C are oblique side views respectively depicting the present chute disconnected and connected to the hopper in accordance with an exemplary embodiment.

IV. DETAILED DESCRIPTION

Referring now to the drawings wherein the showings are for purposes of illustrating embodiments of the article only and not for purposes of limiting the same, like reference numerals are understood to refer to like components.

Figure 1A:
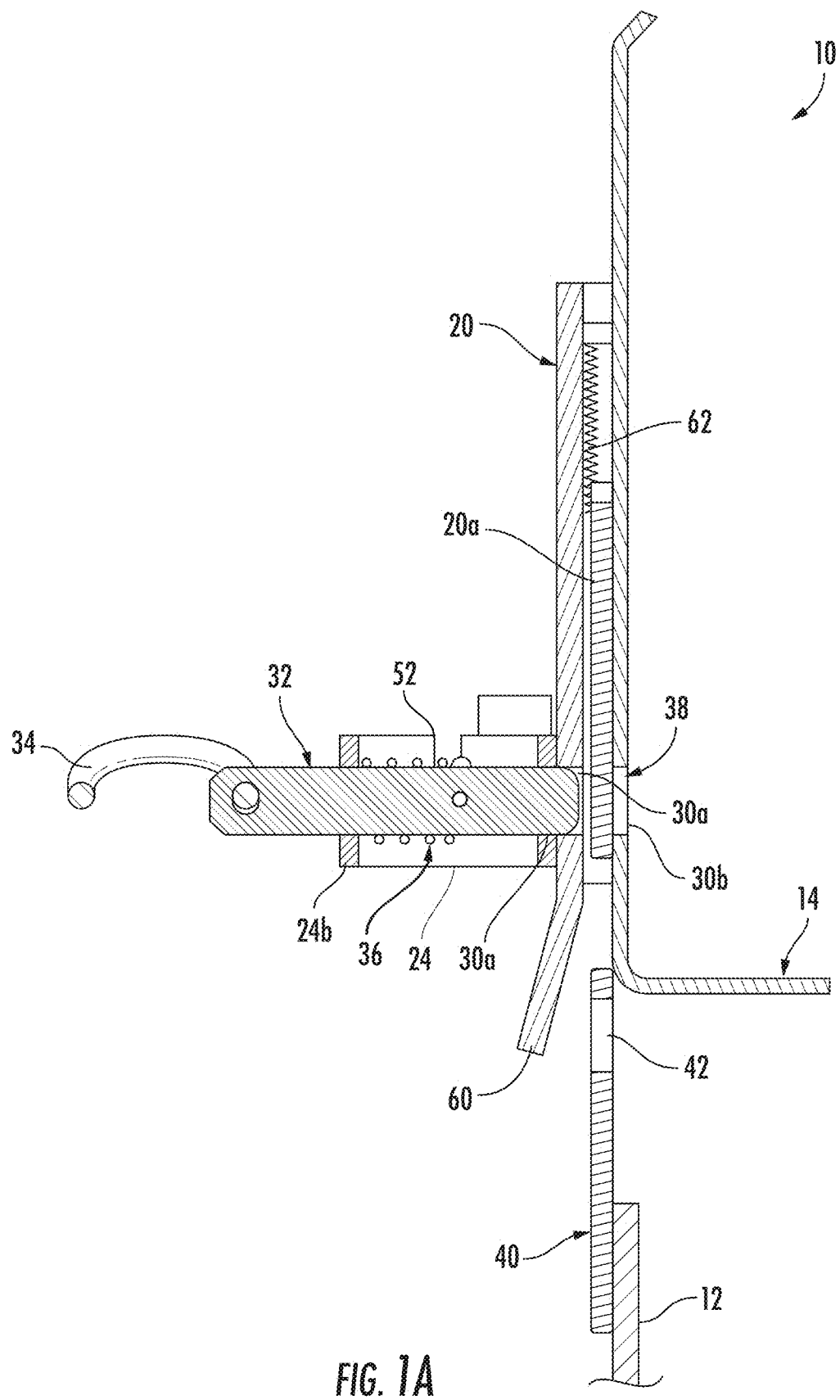
Figure 1B:
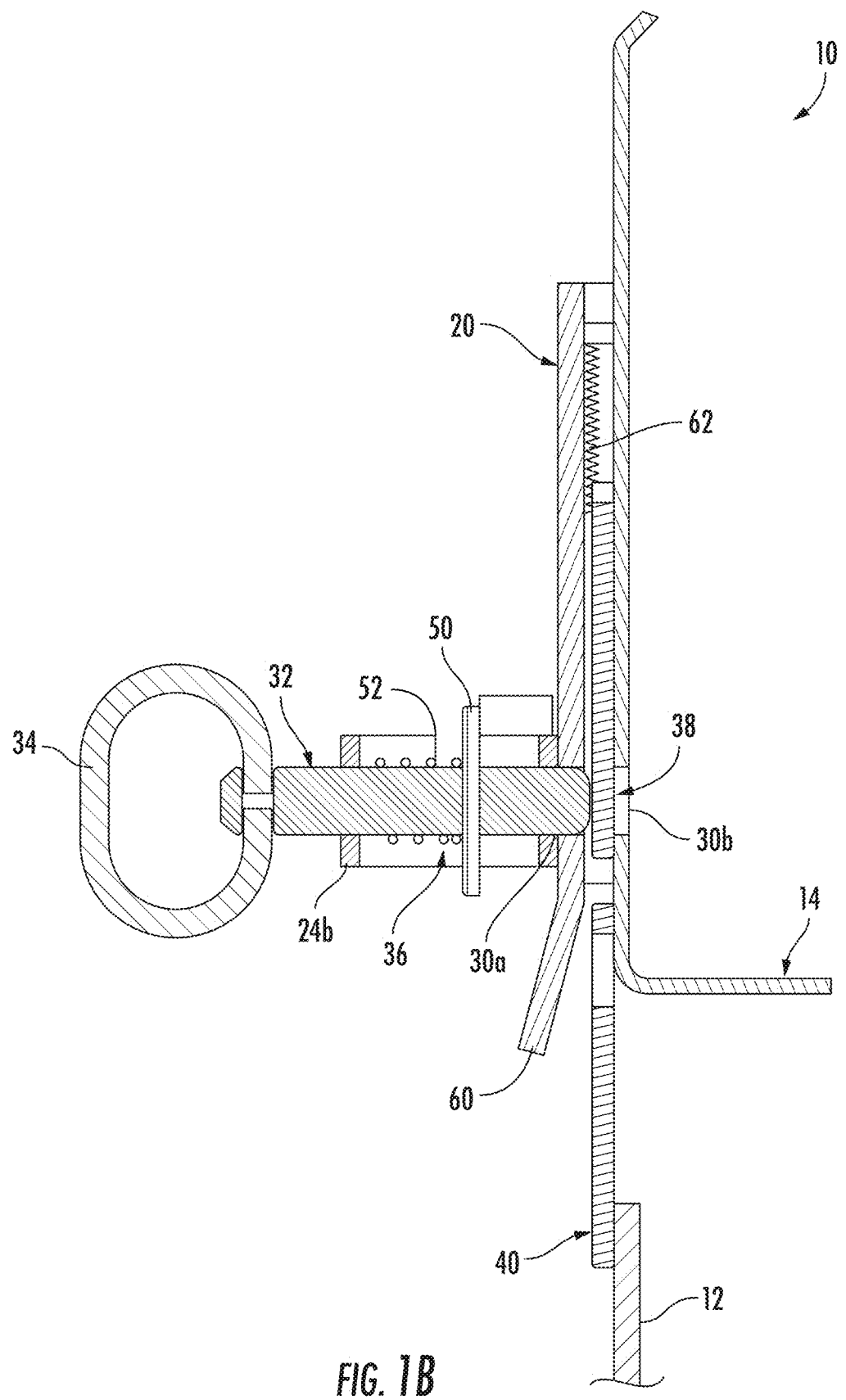
Figure 1C:
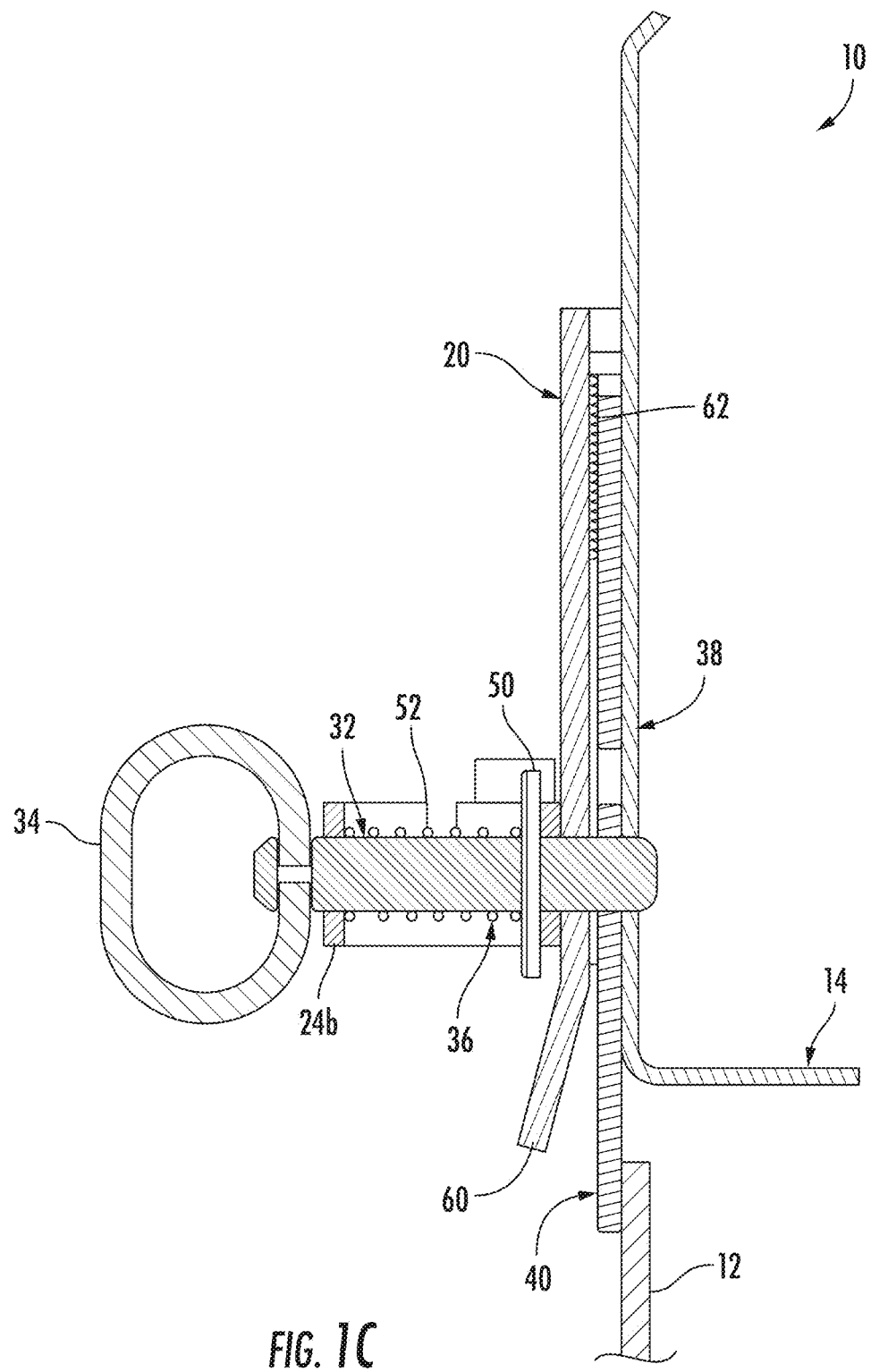
Figure 2A:
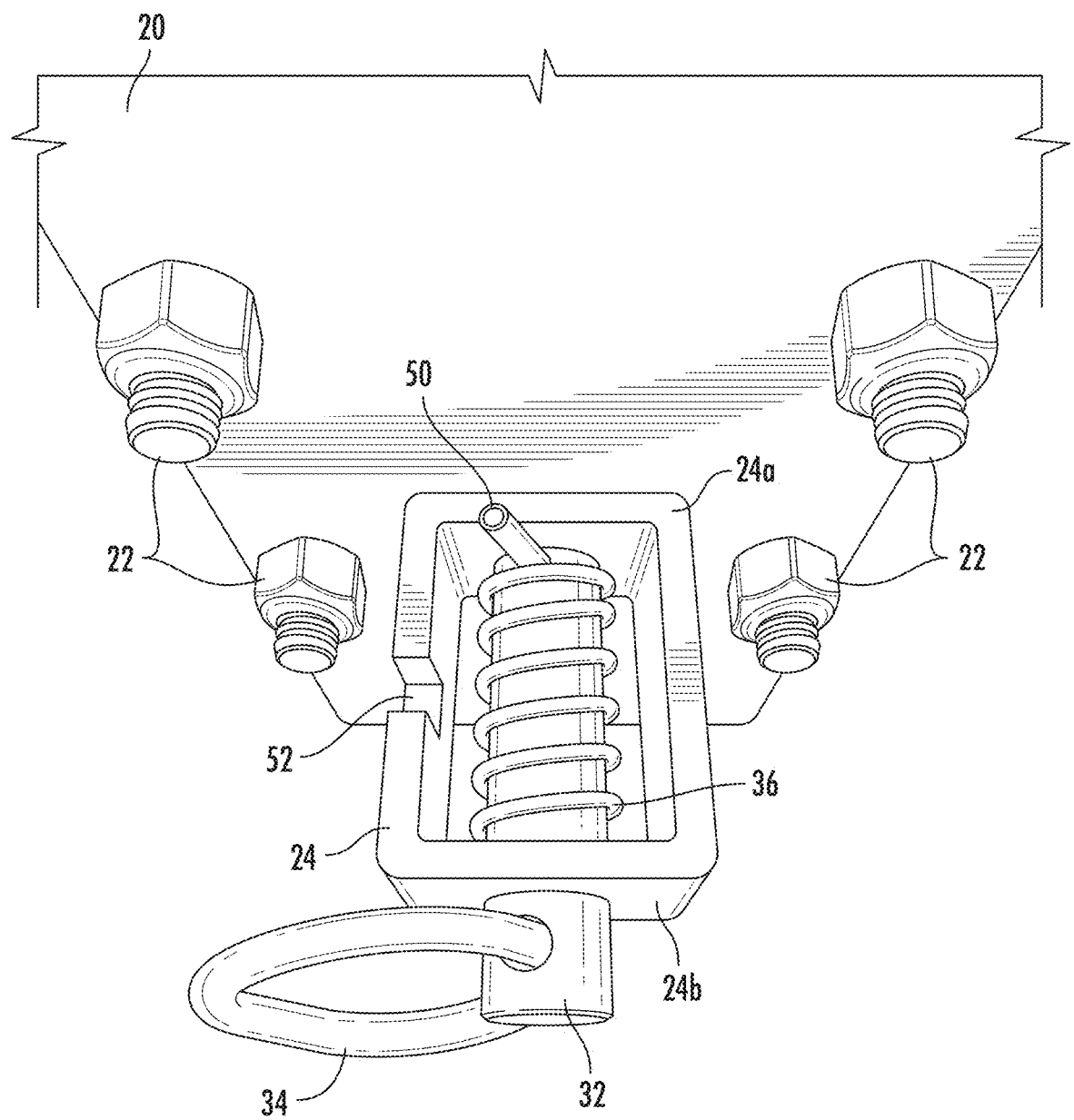
FIGS. 2A and 2B are overhead views respectively depicting the present slam latch in the engagement position and the retracted position in accordance with an exemplary embodiment.
Figure 2B:
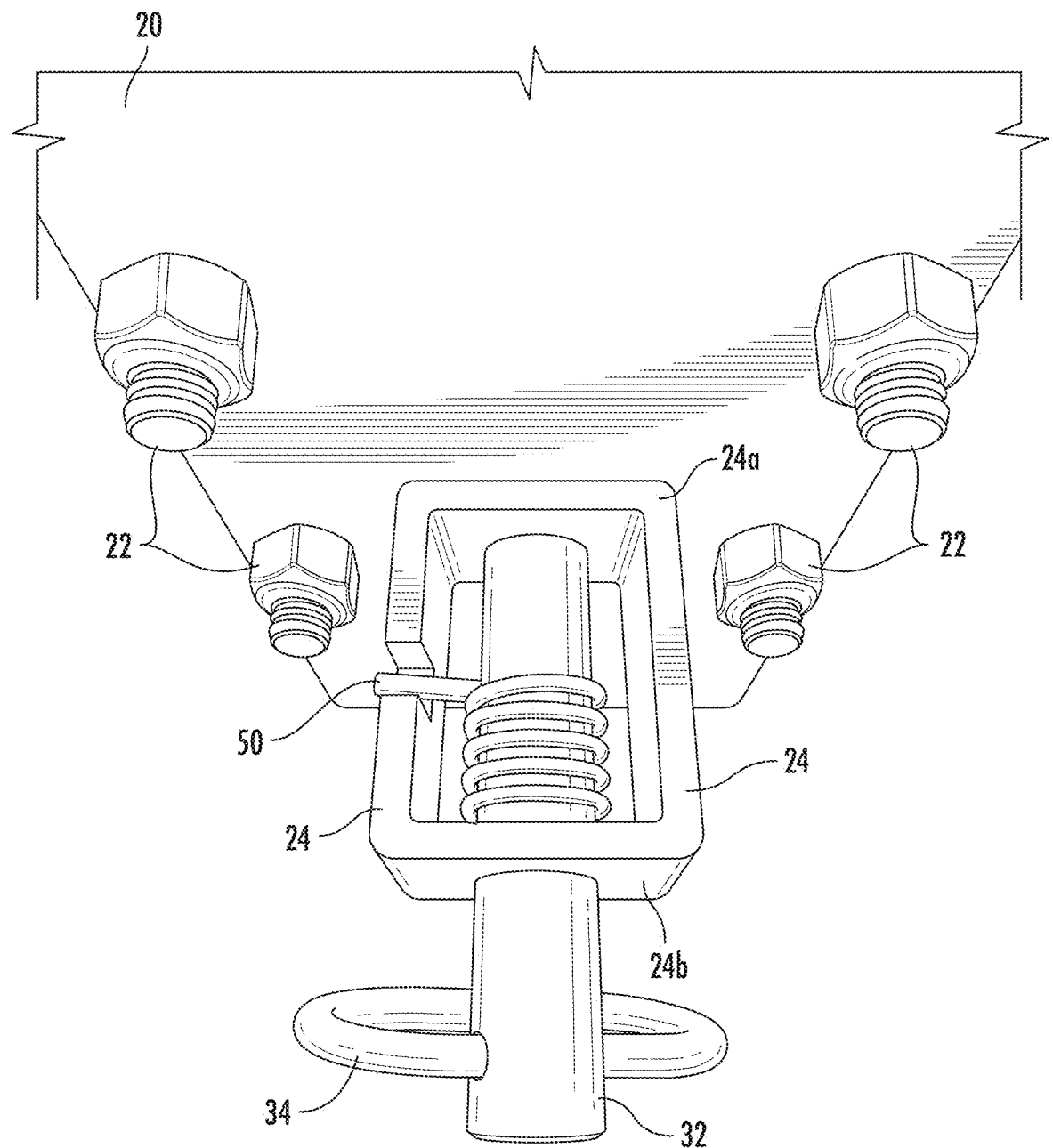

With reference to FIGS. 1A, 1B, 1C, 2A, 2B, 3A, 3B, 4A, 4B, 5A, 5B, and 5C, a slam latch 10 is provided for attaching a chute to a hopper mounted onto a vehicle. A cover 20 is secured to an exterior surface of the hopper 14 and defines a void 20a between an interior surface of the cover 20 and the exterior surface of the hopper 14. As shown in FIGS. 2A and 2B for example, the cover 20 can be bolted to the hopper 14 with one or more bolts 22. However, it is to be appreciated that the cover 20 could be secured to the hopper 14 by any other suitable method as would occur to those having skill in the art.

With specific reference to FIGS. 1A, 1B, 1C, 2A and 2B, the slam latch 10 also includes a support 24 formed integrally with the cover 20 (i.e., via welding or through other suitable method of attachment). The support 24 is preferably in a loop shape having a securing surface 24a attached to the cover 20, and an opposing surface 24b positioned opposite the securing surface 24a. The surfaces 24a, 24b include holes as will be described hereinbelow. The support 24 also includes side surfaces, such that these four surfaces define the loop shape that encloses a central open area. However, a support of any suitable alternate shape could be readily employed without departing from the invention With continued reference to FIGS. 1A, 1B, 1C, 2A and 2B, the aforementioned holes in the surfaces 24a, 24b of the support 24 are coaxially aligned with a first engagement hole 30a formed in the cover 20 that is aligned with a second engagement hole 30b formed in the hopper 14. A pin 32 is mounted to the exterior surface of the cover 20 for back-and-forth movement through the first and second engagement holes 30a, 30b. The support 24 is used for perpendicularly retaining the pin 32 against the exterior surface of the cover 20. The aforementioned holes in the surfaces 24a, 24b of the support 24 are used to guide the pin 32 in its back-and-forth motion through the first and second engagement holes 30a, 30b. If the pin 32 is out of the hole 30a, or if the pin 32 is partially out of the hole 30a, the device will still work. A ring 34 is secured to the end of the pin 32 for gripping of the pin 32 by a user, to retract and withdraw the pin 32 as will be explained hereinbelow.

With further reference to FIGS. 1A, 1B, 1C, 2A and 2B, a biasing member 36 is provided for urging the pin 32 into engagement with the first and second engagement holes 30a, 30b. The biasing member is preferably a deformable coil spring 36 concentrically mounted along the exterior of the pin 32. However, any other suitable biasing member could be alternately employed without departing from the invention.

Figure 4A:
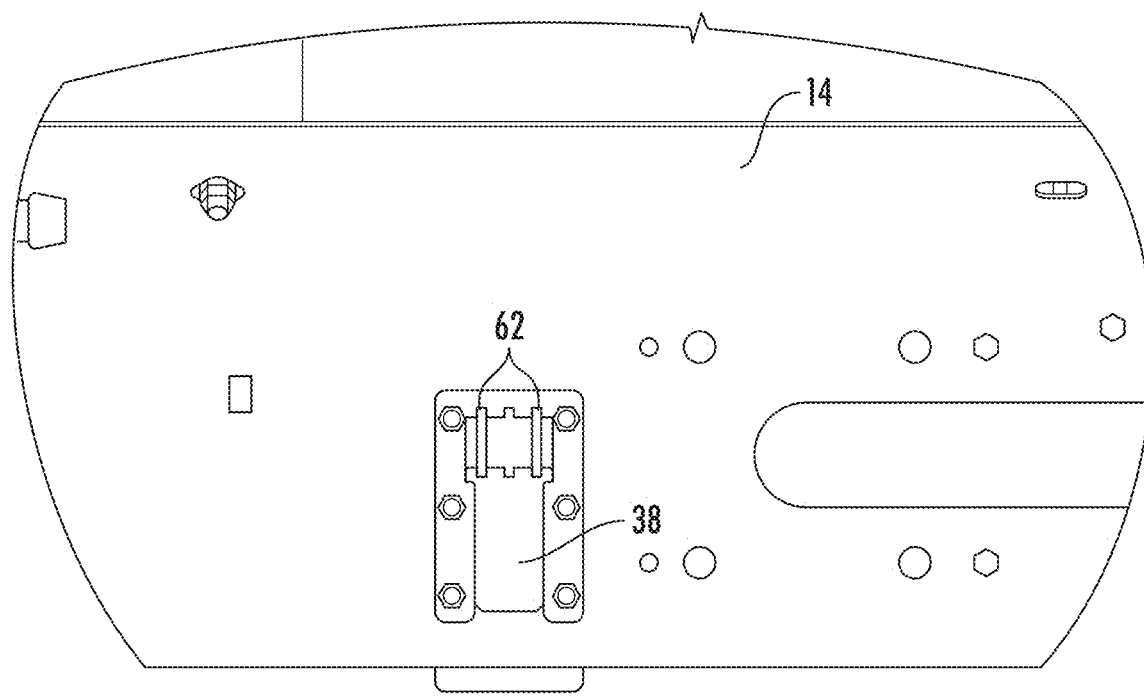
FIGS. 4A and 4B are side views respectively depicting the plunger of the present slam latch mounted to the hopper in the closed position and the open position in accordance with an exemplary embodiment.
Figure 4B:
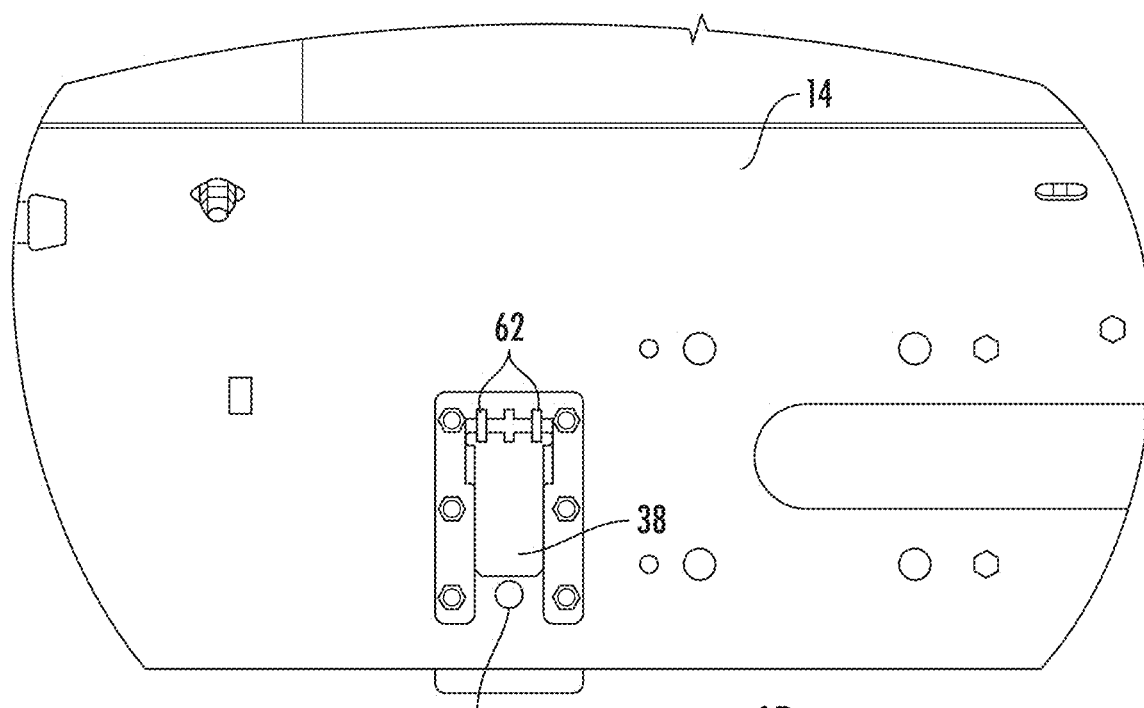

With reference to FIGS. 1A, ID, 1C, 4A and 4B, the slam latch 10 also includes a plunger 38, which is retained in the void 20a between the cover 20 and the hopper 14. The plunger 38 is preferably a flat piece that is sized to fit within the void 20a and configured for free back-and-forth movement within the void 20a between a closed position and an open position. As indicated in FIGS. 1A, 1B, and 4A, in the closed position, the plunger 38 admits the pin 32 through the first engagement hole 30a in the cover 20 but blocks the pin 32 from engagement with the second engagement hole 30b in the hopper 14. Thus, in the closed position, the plunger 38 prevents the pin from engaging with both the first and second engagement holes. As indicated in FIGS. 1C and 4B, when the plunger 38 is in the open position, the second engagement hole 30b is uncovered, and the plunger 38 thereby admits the pin 32 for engagement with both the first and second engagement holes 30a, 30b.

With reference to FIGS. h A, 1B, 1C, 5A, 5B, and 5C, an engagement member 40 is a separate bar attached to the chute 12. The engagement member 40 includes a shape that is configured for sliding into the void 20a between the cover 20 and the hopper 14. The engagement member 40 has a third engagement hole 42 which is placed to be interposed and aligned between the first and second engagement holes 30a, 30b. In operation, the chute 12 is displaced in such a way that the engagement member 40 slides into the void 20a and displaces the plunger 38. The spring 36 urges the pin 32 into engagement with the first, second and third engagement holes 30a, 30b, 42, thereby attaching the chute 12 to the hopper 14. Attachment can be accomplished by upwardly slamming the chute 12 against the hopper, thereby resulting in the "slam latch" 10, in accordance with the invention.

As depicted in FIGS. 1A, 1B, 1C, 2A, 2B, 3A, and 3B, a bar column 50 is provided for extending perpendicularly from the pin 32 for free movement within the open area of the support 24. The bar column 50 is received within a notch 52 formed in the support 24 for retaining the pin 32 in the retracted position, as depicted in FIGS. 1A and 2B. The deformable spring 36 is retained between the bar column 50 and the opposing surface 24b of the support 24, as shown in FIGS. 1A, in, 1C, 2A, and 2B. The deformable spring 36 is used for urging the pin 32 into engagement with the first, second and third engagement holes 30a, 30b, 42, thereby attaching the chute 12 to the hopper 14, as specifically shown in FIGS. 1C, 2A, and 5C.

Figure 3A:
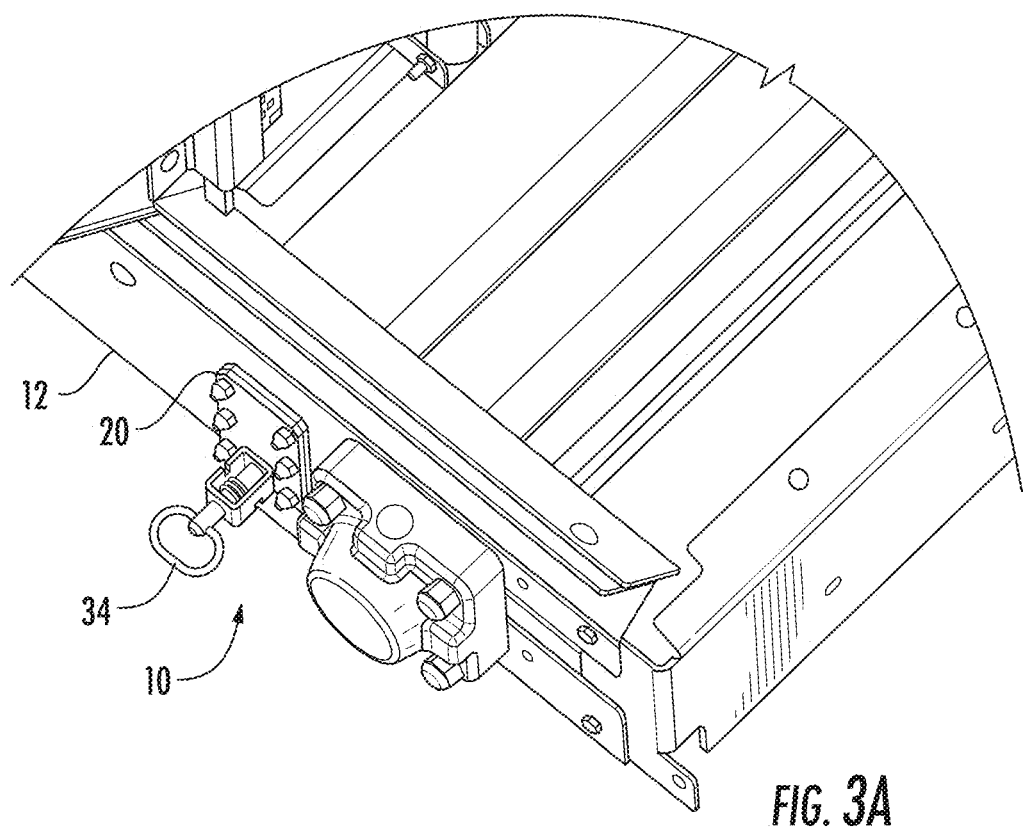
FIGS. 3A and 3B are oblique overhead views respectively depicting the present slam latch mounted to the hopper in the retracted position and the engagement position in accordance with an exemplary embodiment.
Figure 3B:
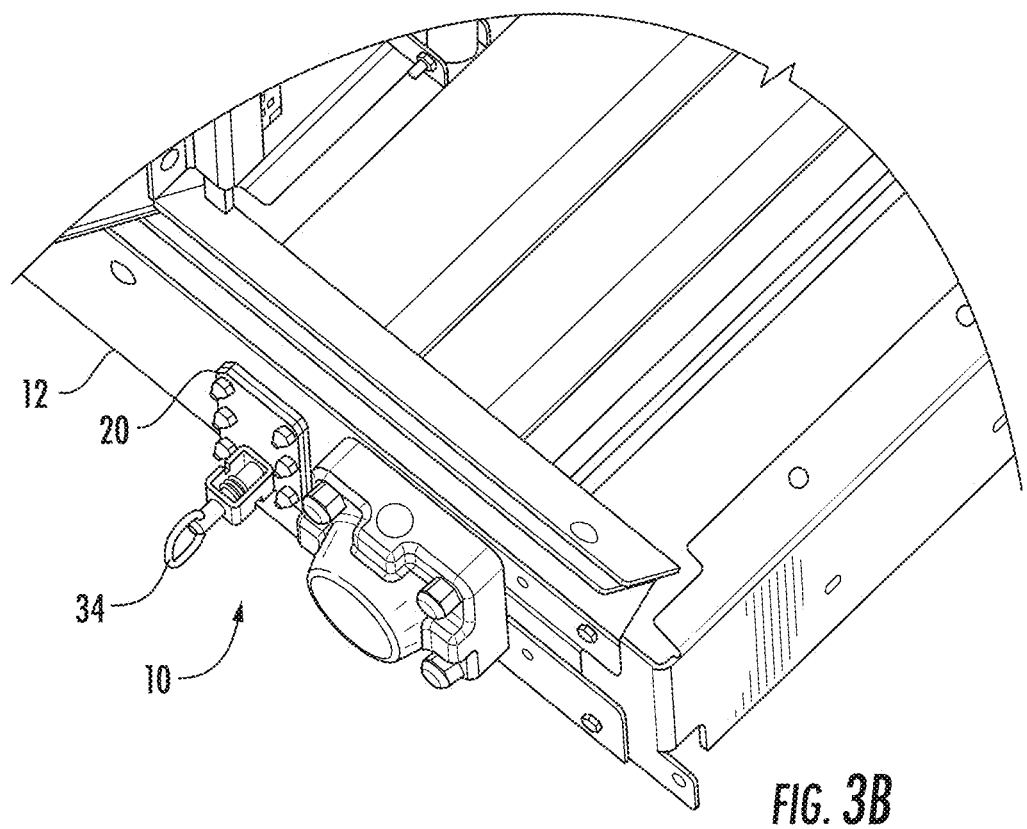

As shown in FIGS. 1A, 1B, C, 2A, 2B, 3A, 3B, 5A, 5B, and 5C, the ring 34 can be gripped to withdraw and retract the pin 32 from the first, second and third engagement holes 30a, 30b, 42 as shown in FIGS. 1A and, 3B. This action releases the chute 12 from the hopper 14, allowing the plunger 38 to move from the open position of FIGS. 1C and 4B to the closed position of FIGS. 1A and 4A, thereby restoring the configuration of the pin 32 shown in FIGS. 1A, 5A and 5B. The pin 32 can be rotated which causes the bar column 50 to be rotated into the notch 52 formed in the support 24 and thereby retaining the pin 32 in a retracted position, as shown in FIGS. 2B, 3A and 5A.

As particularly shown in FIGS. 2A and 2B, the deformable coil spring 36 is concentrically mounted around the circumference of the pin 32 and is retained between the bar column 50 and the opposing surface 24*b* of the support 24. Thus, the deformable coil spring 36 urges the pin 32 toward engagement with the first, second and third engagement holes 30*a*, 30*b*, and 42 when properly aligned, thereby attaching the chute 12 to the hopper 14.

As particularly shown in FIGS. 1A, 1B, and 1C, the cover 20 additionally includes a lip 60 formed on an open bottom of the void 20*a*. This lip 60 expands the angle of entry of the engagement member 40 and thereby facilitates entry of the engagement member 40 into the void 20*a* for engagement with the plunger 38.

As particularly shown in FIGS. 1A, 1B, 1C, 4A, and 4B, the plunger 38 is vertically mounted in the void 20*a* so that is gravitationally drawn downwardly to the closed position and displaced upwardly by the engagement member 40 when moved into the open position. The plunger 38 cooperates with a pair of springs 62 mounted in a top portion of the void 20*a* for urging the plunger 38 downwardly into the closed position.

In the preferred embodiment, as shown in FIGS. 5A, 5B, and 5C, the present slam latch 10 is included with a spreader system of a vehicle which incorporates the hopper 14 for receiving material to be spread (preferably salt or sand) and the chute 12 connected to the hopper 14 with first and second hinges 72*a*, 72*b*, and also including first and second engagement members 40 on opposite sides of the chute 12, each having an engagement hole 42. In such an embodiment, first and second slam latches 10 are mounted on opposite sides of the hopper 14, where it is understand that each slain latch 10 is of a similar configuration to the illustrated views of the drawing figures. Each slam latch 10 engages with the respective engagement holes 42 of the first and second engagement members 40*a*, 40*b* of the chute 12. Each of the first and second slam latches 10 preferably include all of the components described in detail hereinabove.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A slam latch for attaching a chute to a hopper mounted onto a vehicle, comprising:
   a cover secured to an exterior surface of the hopper and defining a void between an interior surface of the cover and the exterior surface of the hopper;
   a first engagement hole formed in the cover that is aligned with a second engagement hole formed in the hopper;
   a pin, mounted to an exterior surface of the cover, for back-and-forth movement through the first and second engagement holes;
   a support for perpendicularly retaining the pin against the exterior surface of the cover;
   a biasing member for urging the pin into engagement with the first and second engagement holes;
   a plunger, retained in the void and configured for free back-and-forth movement between a closed position and an open position, wherein the closed position blocks the pin from engagement with the first and second engagement holes, and wherein the open position admits the pin for engagement with the first and second engagement holes; and
   an engagement member portion of the chute, configured for sliding into the void and having a third engagement hole for aligning between the first and second engagement holes, wherein the chute is displaced such that the engagement member slides into the void and displaces the plunger, enabling engagement of the pin with the first, second and third engagement holes, thereby attaching the chute to the hopper.

2. The slam latch of claim 1, further comprising a ring for gripping of the pin by a user, to withdraw the pin from the first, second and third engagement holes, thereby releasing the chute from the hopper.

3. The slam latch of claim 1, further comprising a bar column, extending perpendicularly from the pin, the bar column being rotated into a notch formed in the support for retaining the pin in a retracted position.

4. The slam latch of claim 3, wherein the biasing member comprises a deformable coil spring concentrically mounted along the pin and retained between the bar column and an opposing surface of the support, the deformable coil spring for urging the pin into engagement with the first, second and third engagement holes, thereby attaching the chute to the hopper.

5. The slam latch of claim 1, wherein the cover further comprises a lip formed on an open bottom of the void for facilitating entry of the engagement member of the chute into the void for engagement with the plunger.

6. The slam latch of claim 1, wherein the plunger is vertically mounted so that is gravitationally drawn downwardly to the closed position and displaced upwardly by the engagement member into the open position.

7. The slam latch of claim 6, further comprising at least one spring mounted in a top portion of the void for urging the plunger downwardly into the closed position.

8. A spreader system of a vehicle, comprising:
   a hopper for receiving material to be spread;
   a chute connected to the hopper with first and second hinges, and also including first and second engagement members on opposite side of the chute, each of the engagement members having an engagement hole;
   first and second slam latches, mounted on opposite sides of the hopper, for each engaging with the respective engagement holes of the first and second engagement members of the chute, wherein each of the first and second slam latches comprise:
   a cover secured to an exterior surface of the hopper and defining a void between an interior surface of the cover and the exterior surface of the hopper;
   a first engagement hole formed in the cover that is aligned with a second engagement hole formed in the hopper;
   a pin, mounted to an exterior surface of the cover, for back-and-forth movement through the first and second engagement holes;
   a support for perpendicularly retaining the pin against the exterior surface of the cover;
   a biasing member for urging the pin into engagement with the first and second engagement holes;
   a plunger, retained in the void and configured for free back-and-forth movement between a closed position and an open position, wherein the closed position blocks the pin from engagement with the first and second engagement holes, and wherein the open position admits the pin for engagement with the first and second engagement boles; and wherein each engagement member of the chute is configured for sliding into the void of a respective slam latch and wherein the engagement hole of each engagement member is configured for aligning between the first and second engagement holes of the respective slam latch, wherein the chute is displaced such that each engagement member slides into the respective void and displaces the respective plunger, enabling engagement of the pin with the respective engagement holes, thereby attaching the chute to the hopper.

9. The spreader system of claim 8, wherein the material to be spread comprises salt.

\* \* \* \* \*